(12) United States Patent
Chang (10) Patent No.: US 11,179,229 B2
(45) Date of Patent: Nov. 23, 2021

(54) DENTAL FLOSS TYPE TOOTH CLEANING DEVICE

(71) Applicant: Kuei Fang Chang, Kaohsiung (TW)

(72) Inventor: Kuei Fang Chang, Kaohsiung (TW)

( * ) Notice: Subject to any disclaimer, the term of this patent is extended or adjusted under 35 U.S.C. 154(b) by 133 days.

(21) Appl. No.: 16/246,741

(22) Filed: Jan. 14, 2019

(65) Prior Publication Data

US 2020/0146793 A1    May 14, 2020

(30) Foreign Application Priority Data

Nov. 8, 2018 (TW) ................... 107215220

(51) Int. Cl.
*A61C 15/00* (2006.01)
*A61C 15/04* (2006.01)

(52) U.S. Cl.
CPC .......... *A61C 15/046* (2013.01); *A61C 15/043* (2013.01)

(58) Field of Classification Search
CPC ...... A61C 15/04; A61C 15/046; A61C 15/048
USPC .................................................. 132/323, 324
See application file for complete search history.

(56) References Cited

U.S. PATENT DOCUMENTS

| | | | | |
|---|---|---|---|---|
| 4,787,403 A | * | 11/1988 | Chen | A61C 15/046 132/327 |
| 5,246,021 A | * | 9/1993 | Katz | A61C 15/046 132/323 |
| 6,161,556 A | * | 12/2000 | Gutierrez | A61C 15/046 132/324 |
| 6,440,149 B1 | * | 8/2002 | Potti | A61B 17/244 606/161 |
| 6,886,570 B2 | | 5/2005 | Lai et al. | |
| 9,573,282 B1 | * | 2/2017 | Sheahan | B26B 1/02 |

* cited by examiner

*Primary Examiner* — Rachel R Steitz
(74) *Attorney, Agent, or Firm* — Winston Hsu (57) ABSTRACT

A dental floss type tooth cleaning device that is configured to clean tooth gap in oral cavity is disclosed. The invention is mainly configured to allow the user, who is preparing to use dental floss to clean tooth gap, to quickly wind the dental floss which follows a floss groove and is tightened and fixed. The dental floss can be dismantled quickly and disposed after use, so as to achieve a recyclable effect.

11 Claims, 11 Drawing Sheets

DENTAL FLOSS TYPE TOOTH CLEANING DEVICE

BACKGROUND OF INVENTION

(1) Field of the Invention

The present disclosure relates to a dental floss type tooth cleaning device, more particularly to a dental floss type tooth cleaning device configured to mount and tighten dental floss and the device is recyclable.

(2) Brief Description of Related Art

Generally, the method of cleaning teeth is to clean the mouth and teeth with a toothbrush after a meal, before going to bed, or after getting up. At a fixed place such as at home or in the office, a toothbrush can usually be used, but a carry-on toothbrush is not suitable to be used at outside. In addition, general restaurant may provide toothpicks and dental floss for guests to use after meals, but these are all disposable supplies. Especially in the case of dental floss sticks, the main materials thereof are plastic floss stick body and dental floss, which are not only high cost but also cause environmental pollution.

If a bare-wire floss is used to clean the teeth, the dental floss should be wrapped on a finger during use, so the finger may directly touch food residue or saliva, that is not conform to hygiene needs for user.

Therefore, some inventors have proposed various solutions, for example, "Hybrid Dental Flosser and Toothbrush" of U.S. Pat. No. 6,886,570 B2. However, conventional products still have complicated structures, which not only are difficult to manufacture, but also extremely complicated structures are particularly prone to bacterial growth after use in oral cavity. If it is reused without effective sterilization, it is easily resulting in the risk of sick from mouth.

Accordingly, the main object of the present disclosure is to provide a dental floss type tooth cleaning device that is easy to carry and implement, environmentally friendly, and easy to disinfect so as to meet oral hygiene needs.

SUMMARY OF INVENTION

The invention relates to a dental floss type tooth cleaning device used for cleaning the tooth gap in oral cavity, it has the characteristics of being convenient to carry and implement, and furthermore, it is more environmentally friendly accompanying with the use of bare-wire floss. The device can be made of skin-friendly silicone, rubber, or Nano-materials that are not easily attached to bacteria. The device of the present disclosure is mainly formed with a grip portion and a bracket portion extending from the grip portion, wherein the bracket portion is formed with a hollow tooth cleaning area for tightening the dental floss, a floss groove for dental floss to pass through and a floss positioning portion for fixing the bare-wire floss in position.

Then in implementation, the initial floss head segment is wound around the floss positioning portion by user to complete initial positioning, and then the bare-wire floss is passed through the floss groove, the bracket portion and then rewound to the floss positioning portion to finish final positioning. After the final positioning, the bare-wire floss is tightened and fixed on the bracket portion, and the bare-wire floss exposed in the tooth cleaning area can be used for cleaning tooth gap. User can simply remove the bare-wire floss after use.

The present disclosure not only has a simple implementation process, but also meets environmental protection requirement of recycle. Furthermore, it's easier for cleaning because of its simple structure.

DETAILED DESCRIPTION OF PREFERRED EMBODIMENTS

Figure 1:
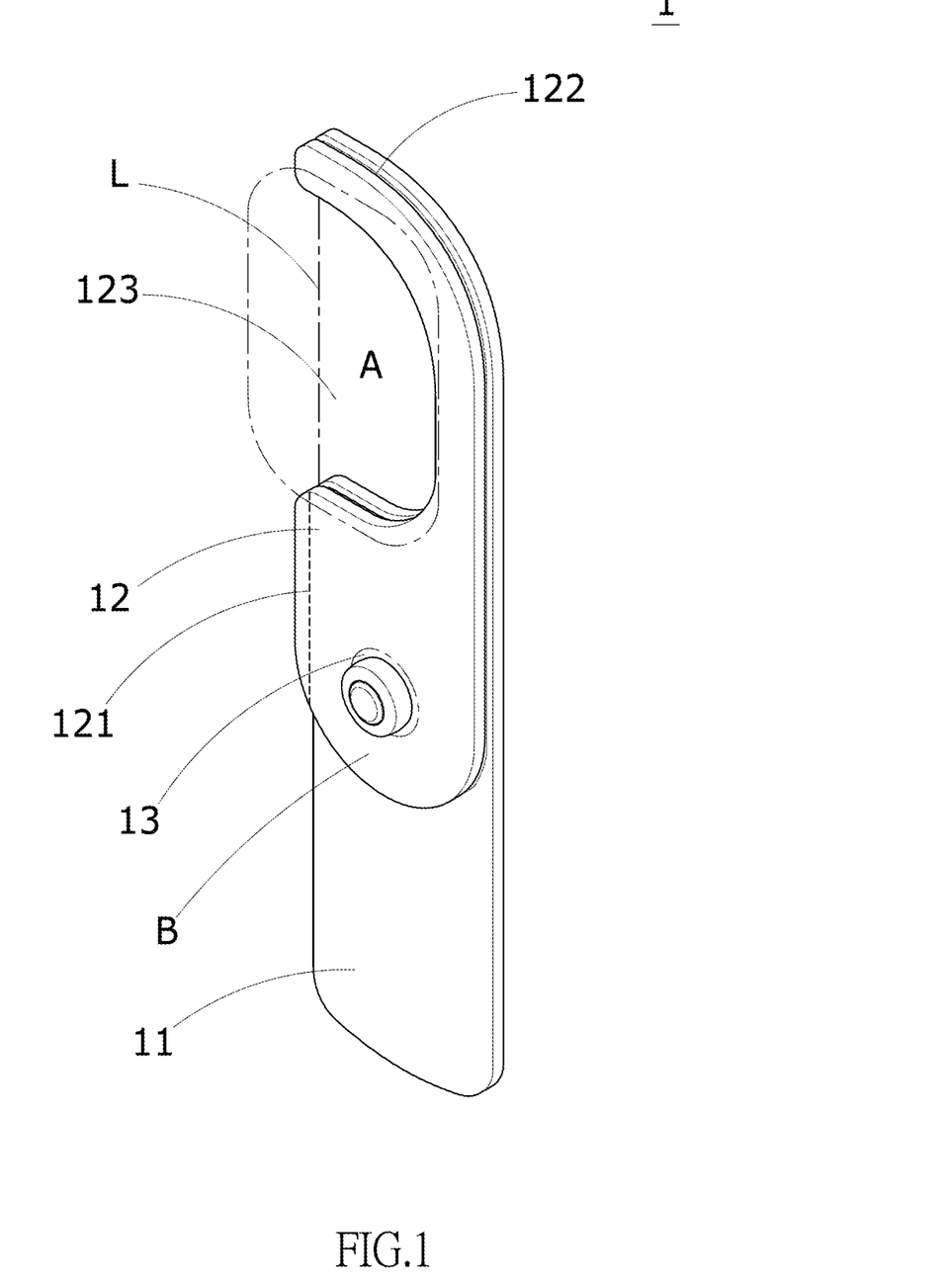
FIG. 1 is a perspective outline view of the present disclosure.

Referring to FIG. 1, the dental floss type tooth cleaning device 1 of the present disclosure is mainly composed of a grip portion 11, a bracket portion 12 and a floss positioning portion 13. The grip portion 11 is mainly for user to hold by hand; the bracket portion 12 is extended and formed from the grip portion 11. Moreover, the bracket portion 12 is formed with a first floss groove 121, a second floss groove 122, and a tooth cleaning area 123 formed between the first floss groove 121 and the second floss groove 122. The tooth cleaning area 123 opposite to the main body of the bracket portion 12 is formed in a hollow shape (A position) for a bare-wire floss L to pass through, so as to form a working space of the tooth cleaning area 123 for tooth gap cleaning. The floss positioning portion 13 is located on the plane of the bracket portion 12, so that the bare-wire floss L after being implemented can be tightened and fixed thereon.

Figure 2:
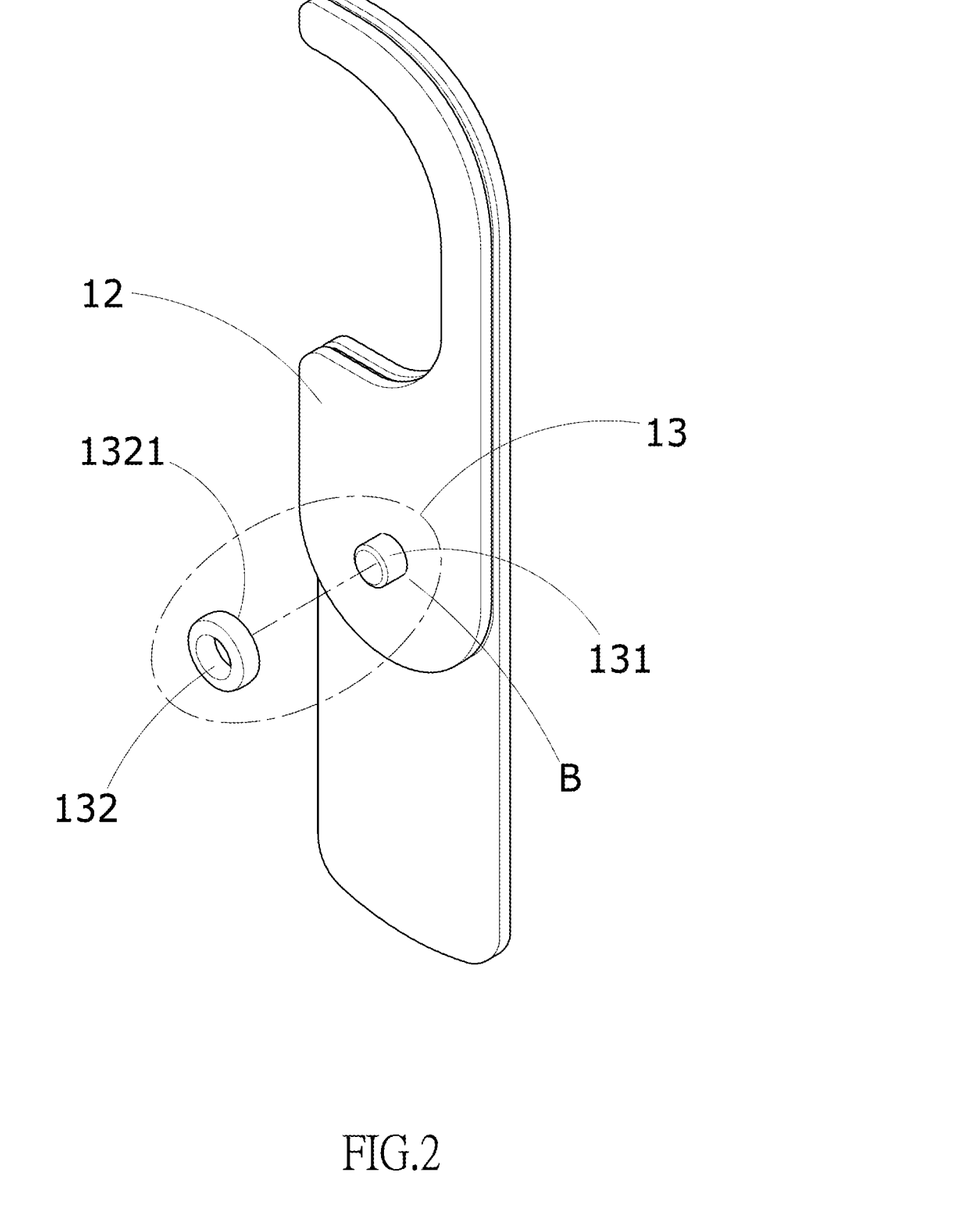
FIG. 2 is a schematic view (I) showing the structure of the present disclosure.
Figure 3:
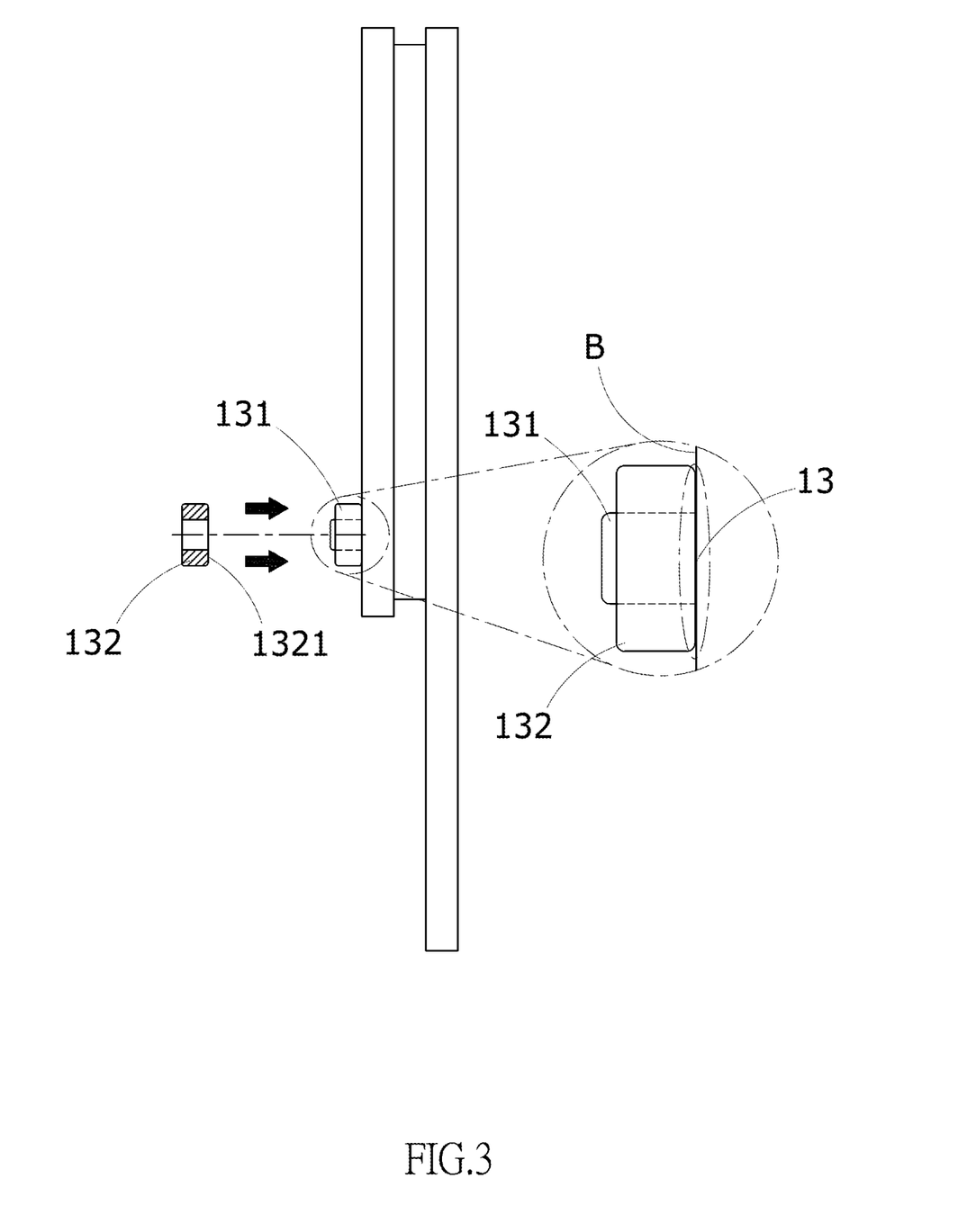
FIG. 3 is a schematic view (II) showing the structure of the present disclosure.

Referring to FIG. 2, the floss positioning portion 13 is mainly composed of a cylinder body 131 and a limiting cap 132. The cylinder body 131 protrudes from the plane B of the bracket portion 12; the limiting cap 132 itself can be slightly elastic, preferably the material of which is, for example, rubber or silicone rubber, capable of being assembled on the cylinder body 131. After being assembled on the cylinder body 131, a pressing surface 1321 of the limiting cap 132 is suppressed on the plane B of the bracket portion 12. Referring to FIG. 3, after the limiting cap 132 is assembled to the cylinder body 131, the pressing surface 1321 is suppressed on the plane B of the bracket portion 12 to form the floss positioning portion 13.

Figure 4:
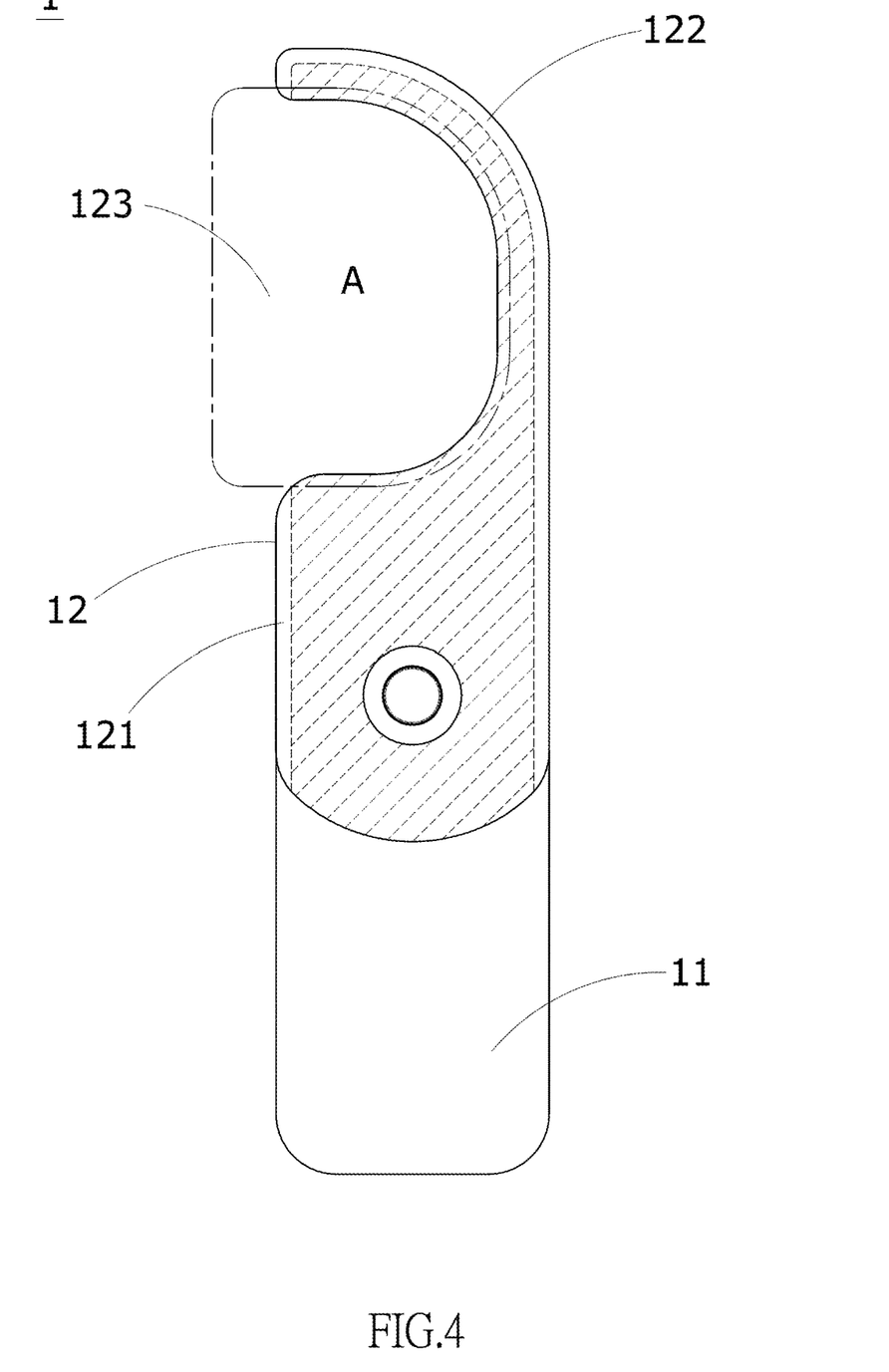
FIG. 4 is a schematic view (III) showing the structure of the present disclosure.

Referring to FIG. 4, the dental floss type tooth cleaning device 1 of the present disclosure has a bracket portion 12 formed with a first floss groove 121, a tooth cleaning area 123 formed in a hollow shape (A position), and a second floss groove 122.

Figure 5:
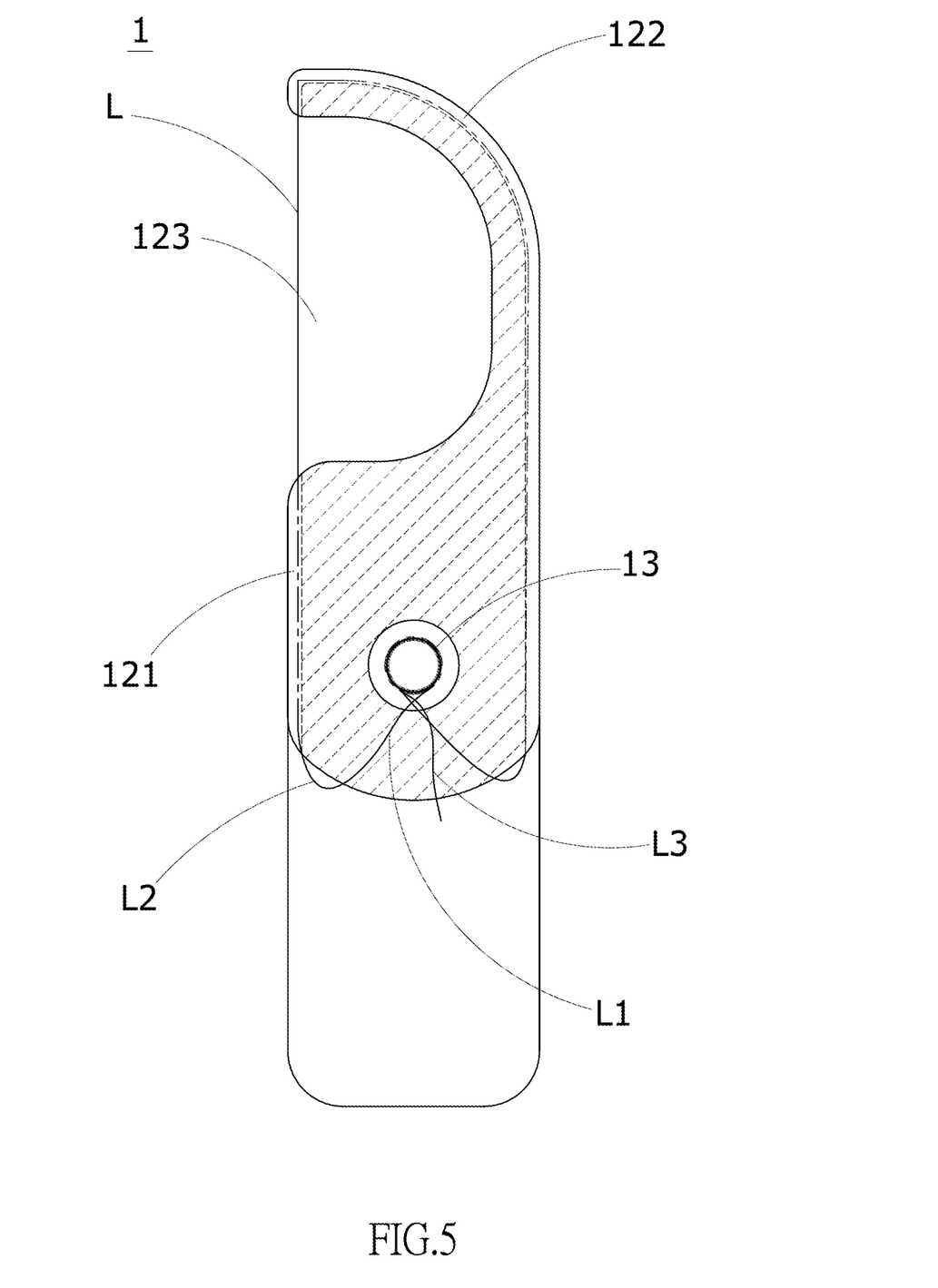
FIG. 5 is a schematic view (I) of a preferred embodiment of the present disclosure.

Accordingly referring to FIG. 5, when user wants to use the dental floss cleaning device 1, the implementation steps are as follows:

Step 1: The bare-wire floss L is pulled out for a certain length segment so that the initial floss head L1 is wound around the floss positioning portion 13 one or several turns, and the initial floss head L1 is firstly fixed unilaterally;

Step 2: an extended length segment L2 is pulled along the first floss groove 121 toward the tooth cleaning area 123, and then through the second floss groove 122, finally it closes to the floss positioning portion 13;

Step 3: Cut off the length segment L2 in such a manner that its end segment forms an floss end L3, and then tighten the floss end L3 in such a manner that the entire bare-wire floss L is to be pulled tightly in the tooth cleaning area 123, and then the floss end L3 is wound around the floss positioning portion 13 one or several turns to finish the fixing of the bare-wire floss L.

Alternatively, the aforementioned "Step 1" can also be replaced by the following steps: The length segment L2 is abutted against the floss positioning portion 13 and is tightened so that the whole bare-wire floss L is to be pulled tightly to the tooth cleaning area 123, and then the length segment L2 is wound around the floss positioning portion 13 one to several times to finish the fixing of the bare-wire floss L.

Figure 6:
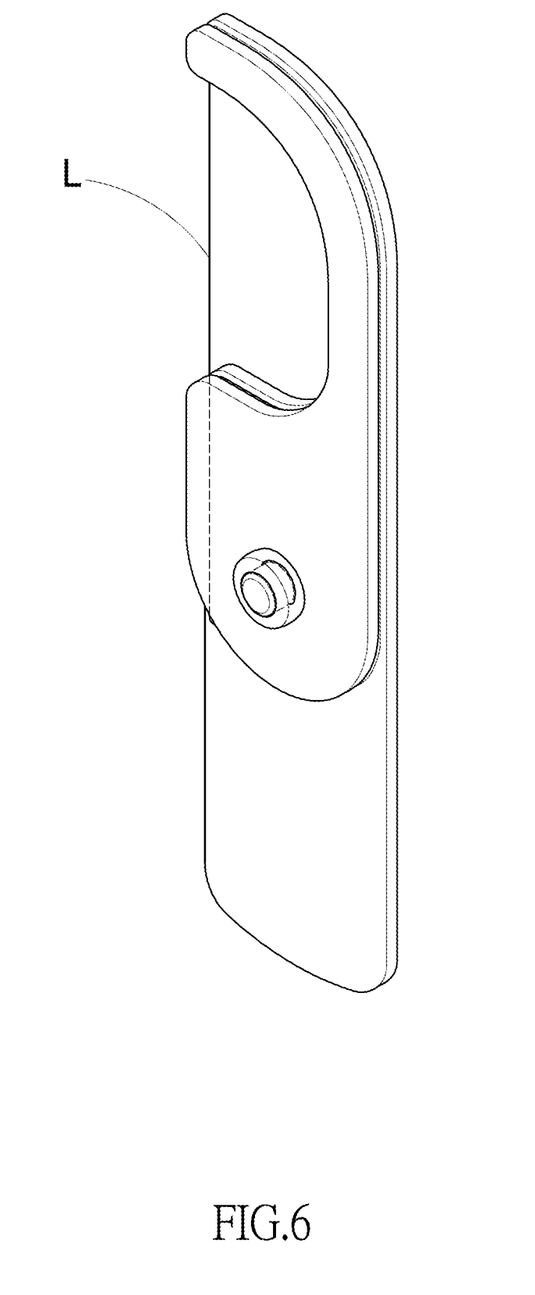
FIG. 6 is a schematic view (II) of the preferred embodiment of the present disclosure.

Next referring to FIG. 6, the bare-wire floss L is fixed after winding, and the entire bare-wire floss L is effectively tightened to form a device capable of performing tooth gap cleaning.

Figure 7:
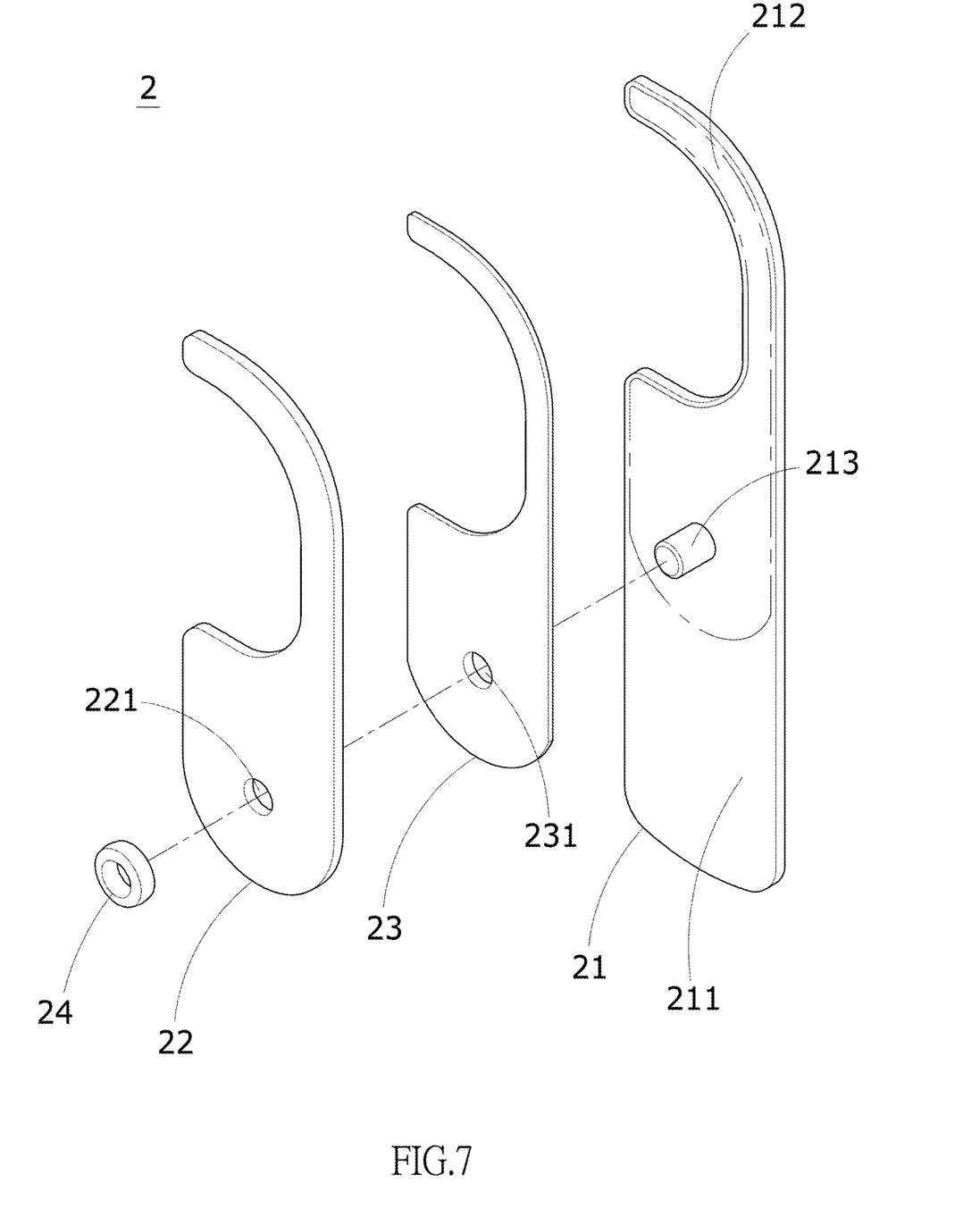
FIG. 7 is a schematic view (I) of another preferred embodiment of the present disclosure.

Referring to FIG. 7, the dental floss type tooth cleaning device 2 of the present embodiment is mainly composed of a first sheet body 21, a second sheet body 22 and a third sheet body 23, wherein the first sheet body 21 has a grip portion 211, a bracket portion 212 extending from the grip portion 211, and a protrusion 213 formed on the first sheet body 21. The outer shape and size of the second sheet body 22 are the same as that of the bracket portion 212 of the first sheet body 21, and a first through hole 221 is formed on the second sheet body 22. The third sheet body 23 has the same shape as the bracket portion 212 of the first sheet body 21, but its size is slightly smaller than the first sheet body 21, and a second through hole 231 is formed on the third sheet body 23. When assembled, the protrusion 213 of the first sheet body 21 is penetrated through the second through hole 231 of the third sheet body 23 and the first through hole 221 of the second sheet body 22, then the first sheet body 21, the third sheet body 23, and the second sheet body 22 are bonded to each other so that the structure of the dental floss type tooth cleaning device 2 is completed. By the provision of slightly smaller size of the third sheet body 23, a concave floss groove enabling floss to pass through is formed between the first sheet body 21 and the second sheet body 22. Finally, a limiting cap 24 is assembled on the protrusion 213 extending from the first through hole 221 of the second body 22, then the assembly can be used with a bare-wire floss. The aforementioned protrusion 213 of the first sheet body 21 can also be formed separately. When assembled, it is directly penetrated through the first sheet body 21, the second sheet body 22, and the third sheet body 23 so that the three sheets can be fixed together.

Figure 8:
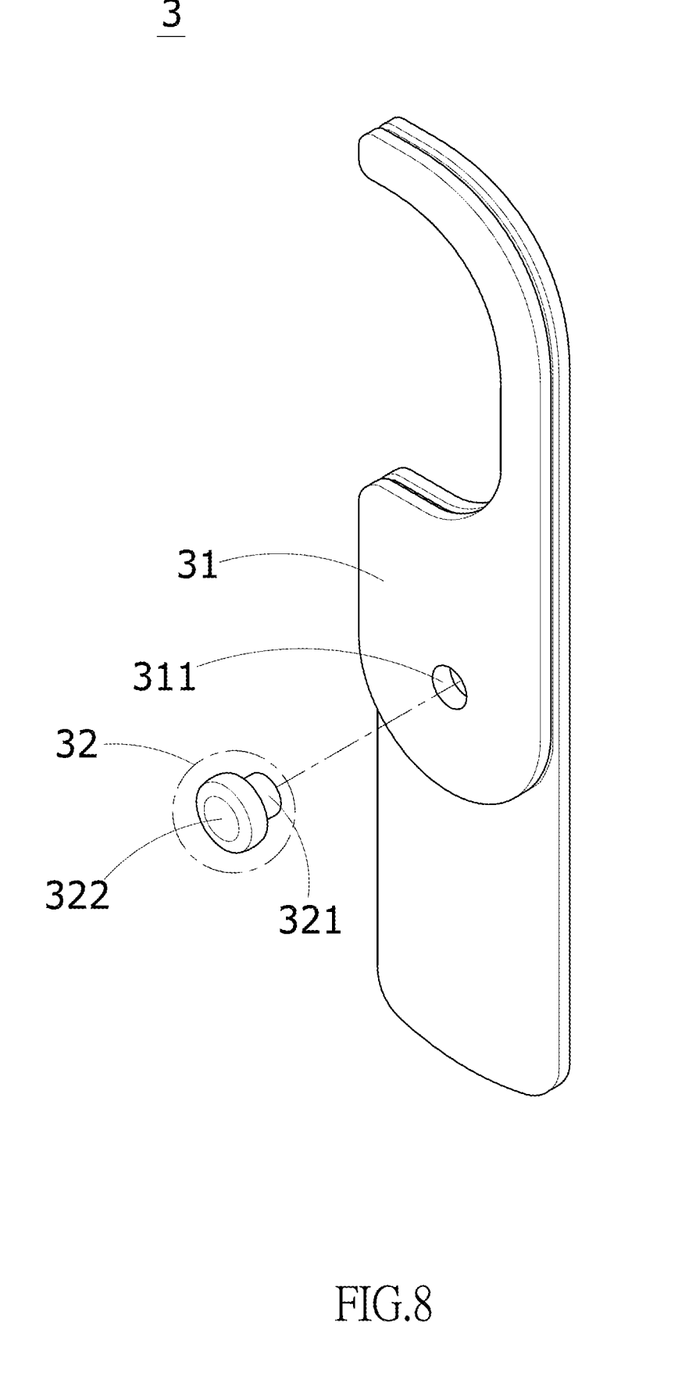
FIG. 8 is a schematic view (II) of the another preferred embodiment of the present disclosure.

Referring to FIG. 8, the dental floss type tooth cleaning device 3 of the present embodiment, either it's integrally formed as a whole body or composed of a plurality of sheets, has an assembly hole 311 formed on the plane of the bracket portion 31, the assembly hole 311 can be used with a floss head limiting device 32. The floss head limiting device 32 is composed of a cylinder body 321 and a limiting cap 322. In implementation, the cylinder body 321 of the floss head limiting device 32 is firstly assembled in the assembly hole 311, and the limiting cap 322 is pressed against the plane of the bracket portion 31 to finish the assembly. The operation with the bare-wire floss is the same as that of the above-mentioned, and hence its detailed description is omitted herein.

Figure 9:
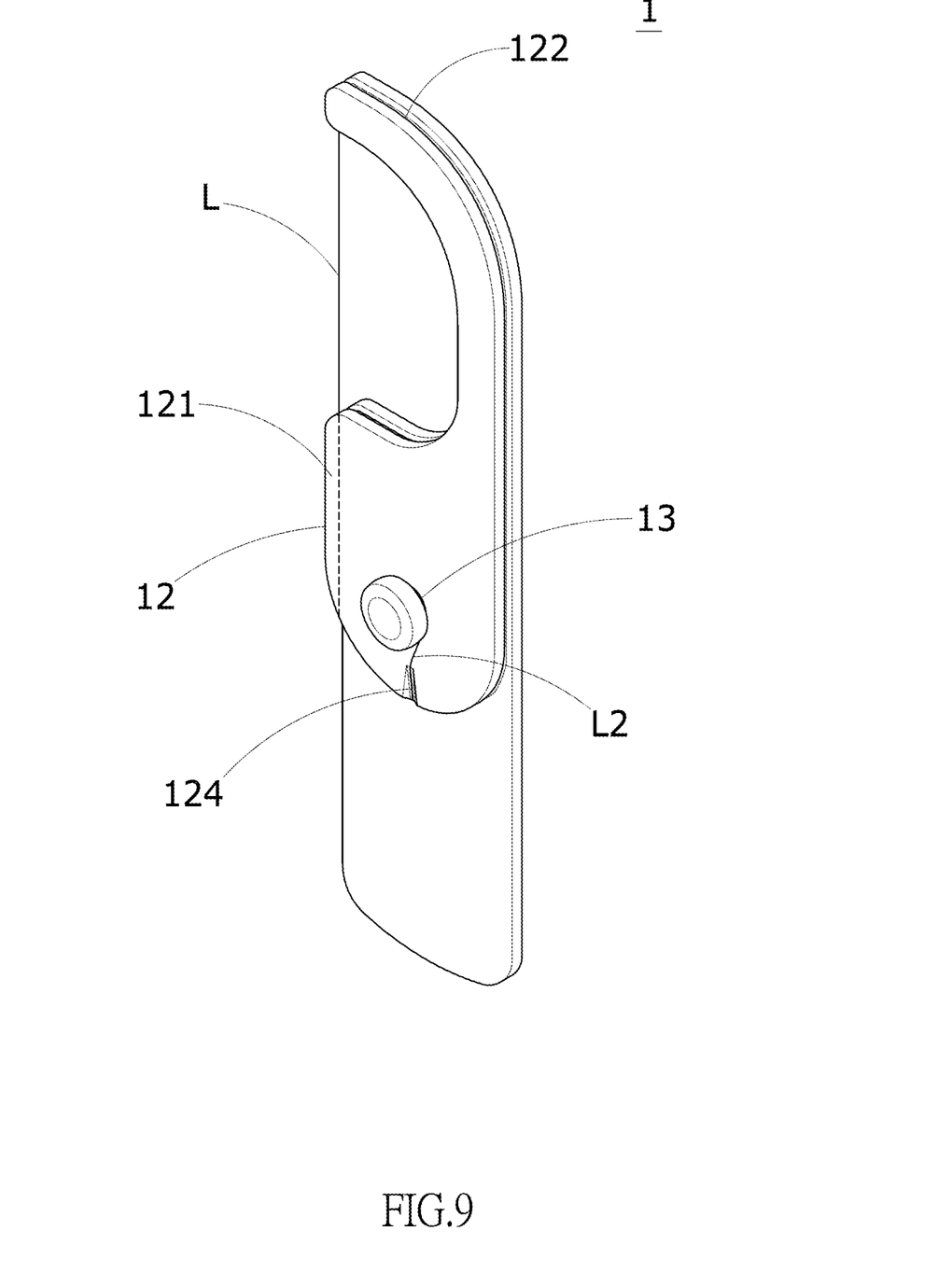
FIG. 9 is a schematic view (III) of the another preferred embodiment of the present disclosure.

Referring to FIG. 9, the dental floss type tooth cleaning device 1 according to the present disclosure, or the dental floss type tooth cleaning device 2 and the dental floss type tooth cleaning device 3 according to other preferred embodiments of the invention may be formed with a floss segment limiting groove 124 at the position of adjacent floss groove (the first floss groove 121, or the second floss groove 122) on the plane of the bracket portion 12. In this manner, the length segment L2 of the bare-wire floss L, after being pulled out from the floss positioning portion 13, can pass firstly through the floss segment limiting groove 124 to receive direction limitation, so that the length segment L2 can be pulled toward the first floss groove 121 more smoothly.

Figure 10:
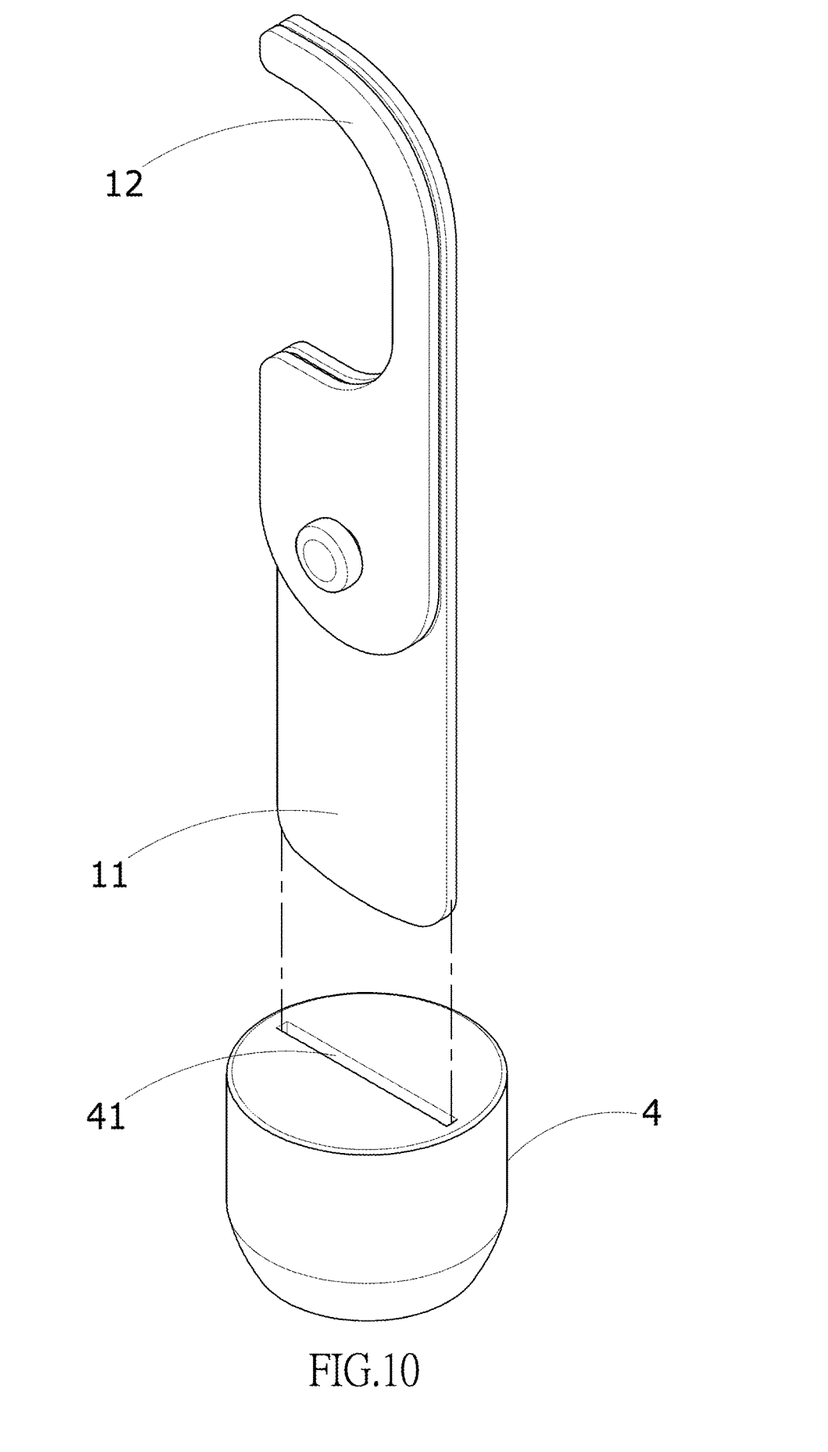
FIG. 10 is a schematic view (IV) of the another preferred embodiment of the present disclosure.

Referring to FIG. 10, the present disclosure further discloses a placement base 4 formed with a placement hole 41 for user to insert the grip portion 11 at one end of the dental floss type tooth cleaning device (1, 2, 3) of the present disclosure therein. In this manner, the dental floss type tooth cleaning device 1 can be placed uprightly when not in use, so as to prevent the bracket portion 12 from being laid flat on flat surface to contact with dirt.

Figure 11:
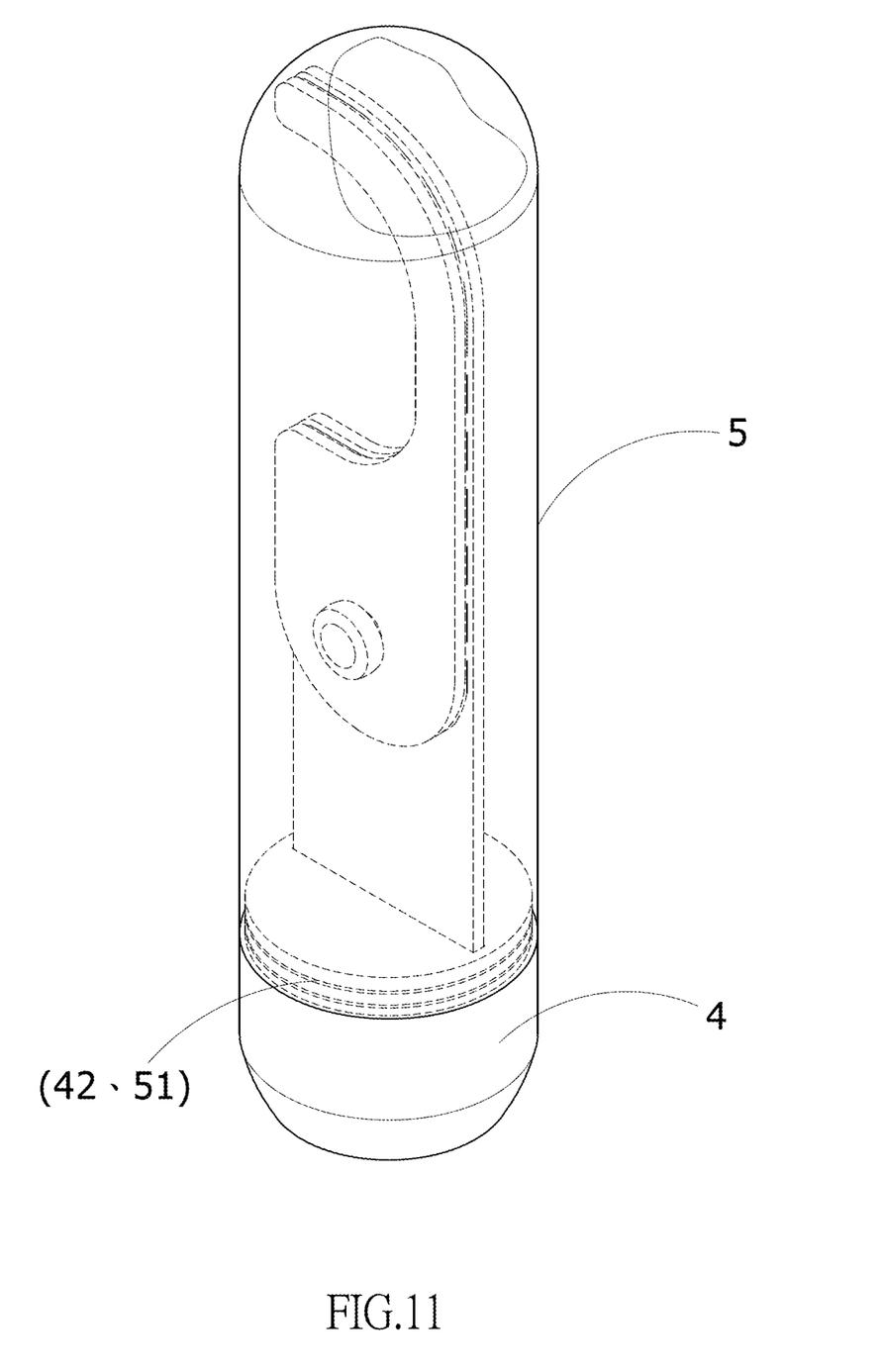
FIG. 11 is a schematic view (V) of another preferred embodiment of the present disclosure.

Referring to FIG. 11, the above-mentioned placement base 4 is further formed with an assembly portions 42 on its exterior appearance, said assembly portions can be combined with a corresponding assembly portion 51 formed on a cover 5, so that the dental floss type tooth cleaning device 1 can be completely covered and stored to be easily portable. Furthermore, the assembly portion 42 of the placement seat 4 and the corresponding assembly portion 51 of the cover 5 can be structures as a pair of mutually engageable threads, buckles, and snap points or the other, but is not limited to this.

Based on foregoing, the present disclosure is implemented according to the above-mentioned manner, it is indeed possible to provide a dental floss type tooth device that is easy to carry and implement, environmentally friendly and easy to disinfect to meet oral hygiene requirements.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

What is claimed is:

1. A dental floss type tooth cleaning device, being configured to clean tooth gap in oral cavity after a bare-wire floss is mounted, comprising:
a first sheet body, a lower portion of said first sheet body being a grip portion, and a protrusion protruding from a plane of said first sheet body;
a second sheet body formed with a first through hole;
a third sheet body formed with a second through hole;

wherein an upper portion opposite to said lower portion of said first sheet body, said second sheet body and said third sheet body together form a bracket portion; when assembled, said protrusion of said first sheet body is penetrated through said second through hole of said third sheet body and said first through hole of said second sheet body, then said first sheet body, said third sheet body, and said second sheet body are bonded to each other to finish the assembly; and a limiting cap assembled on the protrusion extending through said first through hole of said second sheet body;

wherein a size of said third sheet body is slightly smaller than that of said first sheet body and said second sheet body, such that a floss groove is formed around said third sheet body and concaved between said first sheet body and said second sheet body, said floss groove is for allowing said bare-wire floss to pass through.

2. The dental floss type tooth cleaning device in claim 1, wherein a shape of said second sheet body and a shape of said third sheet body is the same as that of the upper portion of said first sheet body.

3. The dental floss type tooth cleaning device in claim 1, wherein said protrusion is formed independently of said first sheet body;

when assembled, said protrusion is directly penetrated through said first sheet body, said second sheet body, and said third sheet body.

4. The dental floss type tooth cleaning device in claim 1, wherein said limiting cap is elastic in property and is suppressed on a plane of said bracket portion after being assembled to said protrusion.

5. The dental floss type tooth cleaning device in claim 1, wherein said limiting cap and said protrusion are configured to allow an initial floss head segment and a final floss end segment head to be wound and fixed thereon.

6. The dental floss type tooth cleaning device in claim 1, wherein a floss segment limiting groove is formed on a plane of said bracket portion, a length segment of said bare-wire floss after being pulled out from said limiting cap and said protrusion passes firstly through said floss segment limiting groove to receive direction limitation.

7. The dental floss type tooth cleaning device in claim 1, further comprising a placement base, wherein a lower end of said grip portion is configured to be assembled into a placement hole of the placement base so as to be fixed uprightly.

8. The dental floss type tooth cleaning device in claim 7, further comprising a cover, wherein said placement base is formed with an assembly portion on its exterior appearance, said assembly portion is configured to be combined with a corresponding assembly portion formed on the cover.

9. The dental floss type tooth cleaning device in claim 8, wherein said assembly portion of said placement base and said corresponding assembly portion of said cover are a pair of mutually engageable threads, buckles or snap points.

10. A dental floss type tooth cleaning device, being configured to clean tooth gap in oral cavity after a bare-wire floss is mounted, comprising:

a first sheet body, a lower portion of said first sheet body being a grip portion;

a second sheet body;

a third sheet body; and a floss head limiting device comprising a cylinder body and a limiting cap connected with the cylinder body;

wherein an upper portion opposite to said lower portion of said first sheet body, said second sheet body and said third sheet body together form a bracket portion, an assembly hole is formed on a plane of said bracket portion, said cylinder body is assembled in said assembly hole and said limiting cap is pressed against said plane of the bracket portion, such that said first sheet body, said third sheet body, and said second sheet body are bonded to each other;

wherein a size of said third sheet body is slightly smaller than that of said first sheet body and said second sheet body, such that a floss groove is formed around said third sheet body and concaved between said first sheet body and said second sheet body, said floss groove is for allowing said bare-wire floss to pass through.

11. The dental floss type tooth cleaning device of claim 10, wherein said limiting cap and said cylinder body are integrally formed together.

* * * * *